United States Patent [19]

Melnick

[11] Patent Number: 5,104,279

[45] Date of Patent: Apr. 14, 1992

[54] AIRCRAFT TOWING VEHICLE

[76] Inventor: Irving Melnick, 1838 Rougemont, Switzerland

[21] Appl. No.: 585,894

[22] Filed: Sep. 20, 1990

[51] Int. Cl.⁵ .............................................. B60P 3/11
[52] U.S. Cl. .................................... 414/428; 180/904; 244/50
[58] Field of Search ............................... 414/426–430; 180/904; 280/402; 244/50

[56] References Cited

U.S. PATENT DOCUMENTS

| | | | |
|---|---|---|---|
| 2,362,981 | 11/1944 | Baum | 180/904 X |
| 2,380,415 | 7/1945 | Carruthers | 414/429 |
| 2,549,489 | 4/1951 | Krause | 414/427 |
| 3,785,517 | 1/1974 | Brajkovich | 280/402 X |
| 4,375,244 | 3/1983 | Morin | 414/429 X |
| 4,632,625 | 12/1986 | Schuller et al. | 414/429 |
| 4,730,685 | 3/1988 | Sinkkonen | 180/904 X |
| 4,911,603 | 3/1990 | Pollner et al. | 414/429 X |
| 4,950,121 | 8/1990 | Meyer et al. | 414/429 X |

Primary Examiner—David A. Bucci
Attorney, Agent, or Firm—Malin, Haley, McHale, DiMaggio & Crosby

[57] ABSTRACT

A towing vehicle for towing a large aircraft that lifts, supports and moves the nose wheel of and consequently the aircraft itself, is provided. The towing vehicle has a frame which internally receives the aircraft's nose wheels. Forward and rear arcuate shaped nose wheel engaging members contact a substantial portion of the front and rear circumferential surfaces of the nose wheels. The forward nose wheel engaging members are pivotally attached to the front of the frame. The rear nose wheel engaging members are connected through hydraulic rams to the rear of the frame. When the hydraulic rams are extended, the nose wheels are lifted and rotated around the pivotal connection of the forward nose wheel engaging members and the frame thereby lifting and supporting the nose wheels off the ground. Movement of the towing vehicle then also moves the aircraft whose nose wheels are supported. The towing vehicle may either be a trailer type device which may be attached to an existing aircraft towing device or may be an integral unit which is able to move under its own power.

10 Claims, 4 Drawing Sheets

AIRCRAFT TOWING VEHICLE

BACKGROUND OF THE INVENTION

1. Field of the Invention

This invention relates generally to a towing vehicle for large aircraft such as a Boeing 747 and in particular, to a ground operated aircraft towing vehicle in which the nose wheel of the aircraft is lifted and secured off the ground by the aircraft towing vehicle to permit ease in towing of the aircraft along the taxi ways and for positioning the aircraft at designated locations at the terminal.

2. Description of the Prior Art

Aircraft towing vehicles are known in the prior art. One such vehicle is shown in U.S. Pat. No. 4,632,625 issued to Schuller et al. on Dec. 30, 1986. In the Schuller patent, a towing tractor is shown in which the nose wheel of the aircraft is drawn onto a platform. U.S. Pat. No. 4,036,384, issued to Johnson on July 19, 1977, shows a truck for transporting an airplane by its nose wheel. The truck has a horizontal nose roller adapted to be rammed under the nose wheel of the airplane landing gear to elevate the nose wheel. U.S. Pat. No. 3,049,253, issued to Cabral on Aug. 14, 1962, shows a manually actuated airplane tow tractor that supports the nose wheel. U.S. Pat. No. 4,658,924, issued to Dobbie on Apr. 21, 1987, shows an aircraft ground handling vehicle which includes a rotating platform upon which the nose wheel is mounted for movement.

All of these devices have drawbacks which include high cost for the devices and complexity of operation and manipulation by ground crews. With the high volume of aircraft at today's municipal airports and the extremely large aircraft using the taxi ways and terminal areas, it is essential that the large aircraft be quickly and easily transported to the desired locations. The present invention provides a simple aircraft towing tractor which is comparatively inexpensive, which does not require ballast, and which can manipulate the large weight and size of aircraft nose wheels and the aircraft supported thereby, such as on a Boeing 747, by ground crew members. The present invention can also be manufactured as a primary purpose ground vehicle in a single unit or as a separate towed vehicle for use by currently existing ground tractors.

SUMMARY OF THE INVENTION

An aircraft towing vehicle comprising a rigid rectangular frame having wheels mounted on each side of the frame leaving the center of the frame open. The rectangular support frame is comprised of very rigid metal beams firmly attached to each other including a front beam, a pair of side beams, and an openable rear beam. T he rear beam of the frame is hinged so that it may be opened to permit receipt of the nose wheel assembly of a large aircraft such as the 747.

A plurality of circular or arcuate shaped support members are laterally displaced along the front beam. These support members are concavely curved to approximate the exterior circumference of the nose wheel tires. In the case of a large aircraft such as a Boeing 747, there will be four forward nose wheel engaging members grouped together in two groups of two members, each group corresponding to one of the two nose wheels typically present on large aircraft. Each of the forward nose wheel engaging members will engage approximately 100 degrees of the circumference of the aircraft nose wheel while the two forward nose wheel engaging members are grouped together engaging each of the aircraf's two nose wheels. The grouped forward nose wheel engaging members are connected together by a rod assembly which runs parallel to the front beam. This rod assembly pivotally mounts the grouped forward nose wheel engaging members to the front beam of the frame. This connection permits pivotal motion vertically around the rod assembly. Each of the grouped nose wheel engaging members are also disposed laterally along the front beam so that each one engages a different tire of the aircraft nose wheel assembly.

The rear beam, which is hinged to open, also has attached a plurality of rear nose wheel engaging members. These rear nose wheel engaging members are movably mounted through clevis assemblies and hydraulic pumps to the upper portion of the rear support beam. Also like the forward nose wheel engaging members, the rear nose wheel engaging members each engage approximately 100 degrees of the circumference of the aircraft nose wheels. Like the forward nose wheel engaging members, the rear nose wheel engaging members are grouped together in groups of two, each group corresponding to an individual nose wheel.

The rear nose wheel engaging members are attached to the forward shaft of a hydraulic piston and can be moved inwardly toward the center of the frame and upwardly through action of the hydraulic pistons. The two rear nose wheel engaging members grouped together are actuated by one hydraulic piston. The movement of the rear nose wheel engaging members through the actuation of the hydraulic piston and a hydraulic pump will initially cause the aircraft tires to be pressed firmly against the forward nose wheel engaging members. Further movement of the rear nose wheel engaging members will cause the aircraft tires and subsequently the nose wheel assembly to move upwardly through the pivotal action of the forward support members so that the aircraft nose wheel assembly will be lifted off the ground.

In one embodiment where the invention is incorporated in a towed trailer which can be attached to a currently existing towing tractor, the forward support beam may also include a locking mechanism for connecting the invention to the currently existing towing tractor. Preferably, this is done by connecting three clevis joints across the front of the towed trailer with corresponding clevis joints on the back of the towing tractor. However, it is possible to connect the towed trailer to the towing tractor through the use of a rigid pin and clevis or the like such as is commonly used to connect a tow bar to such towing tractors.

In another embodiment where the invention is incorporated into a primary towing tractor in a single unit, the front support beam is attached, through rigid structural members, to the conventional front area of an ordinary towing tractor. In this embodiment, it has been found that the rear wheels of the towing vehicle which will be described in detail hereafter, should be steerable through a power steering mechanism, to aid in the maneuverability of the towing vehicle.

Actuation of the hydraulic pistons in the invention is obtained through a hydraulic pump and associated conduits connected to the pistons. The hydraulic pump may be driven from an energy source located on the tractor housing itself.

To operate the invention, the main support frame is positioned in front of the nose wheel assembly of the aircraft to be towed and the rear support beam is opened to allow the aircraft nose wheels to be placed within the center of the front. The frame is then moved backward so that the aircraft nose wheel assembly is received inside the frame until the aircraft nose wheels contact the forward nose wheel engaging members along the outer perimeter of each of the aircraft nose wheels. A hydraulic piston is then used to close the rear supporting beam and lock it to the frame. The closing and locking of the rear supporting beam simultaneously causes the rear nose wheel engaging members to firmly engage the rear portion of the aircraft tire perimeters. The operator then actuates the two hydraulic pumps that cause inward and upward movement of the rear nose wheel engaging members causing the aircraft nose wheels and nose assembly to move forward and subsequently upward as the nose wheels are pressed against the forward nose wheel engaging members. This action thus raises the nose wheels and nose wheel assembly off the ground.

The rear wheels of the towing vehicle are mounted outside and on each side of the frame and are aligned with the center line of the aircraft nose wheel assembly when the nose wheel assembly is positioned within the frame. This alignment of the rear wheel of the towing vehicle with the center line of the nose wheel assembly causes the center of gravity of the nose wheel assembly to be positioned directly over the rear tires of the towing vehicle. Therefore, the force of lifting the nose wheel assembly is transmitted down through the tires of the vehicle preventing any pivotal movement of the front or rear of the towing vehicle through torque due to the weight of the aircraft.

As stated above, where the device is combined into a single towing unit, it is preferable to provide a power steering assembly such as is common for large vehicles to allow the rear wheels to be steerable. This aids the tow vehicle in maneuverability.

Once the nose wheel assembly of the aircraft has been raised off the ground and the hydraulic actuating pistons have reached their maximum extension, the hydraulic pistons are then locked in this extended position. This permits utilization of the towing vehicle and allows the aircraft to be towed and positioned by movement of the towing vehicle itself. As stated above, the towing vehicle may include a four wheel tractor in which the front and rear wheels can be independently turned adding increased mobility to the entire unit.

Once the large aircraft has been positioned at its destination at the airport, the operator then reverses the actuation of the hydraulic pistons allowing the nose wheel assembly to move downwardly and away from the forward nose wheel engaging members until the wheels are gently placed on the ground. The rear support beam is then unlocked and opened by a hydraulic piston until it swings open to its full open position. At this point, the tow vehicle can then be moved away from the nose wheel assembly of the aircraft sufficiently far to permit closing the rear support beam. The tow vehicle is then ready for movement to assist another aircraft.

It is an object of this invention to provide an improved aircraft towing vehicle which includes an arcuate pivotal and movable nose wheel assembly engaging mechanism which allows for firm support and raising of the aircraft nose wheel assembly to permit towing of large aircraft such as a Boeing 747.

It is another object of this invention to provide a towing vehicle for large aircraft which is simple in design and which can reliably and safely raise and lower the nose wheel assembly of the aircraft to permit towing of the aircraft with extreme maneuverability.

Another object of the invention is to provide a support mechanism for firmly supporting and raising the nose wheel assembly of a large aircraft such as the Boeing 747 which invention can be adapted for use as a trailer for attachment to a conventional, existing aircraft towing vehicle or can be incorporated into a permanent towing vehicle itself.

In accordance with these and other objects which will be apparent hereinafter, the instant invention will now be described with particular reference to the accompanying drawings in which like elements are referred to by like numerals.

PREFERRED EMBODIMENT OF THE INVENTION

Figure 1:
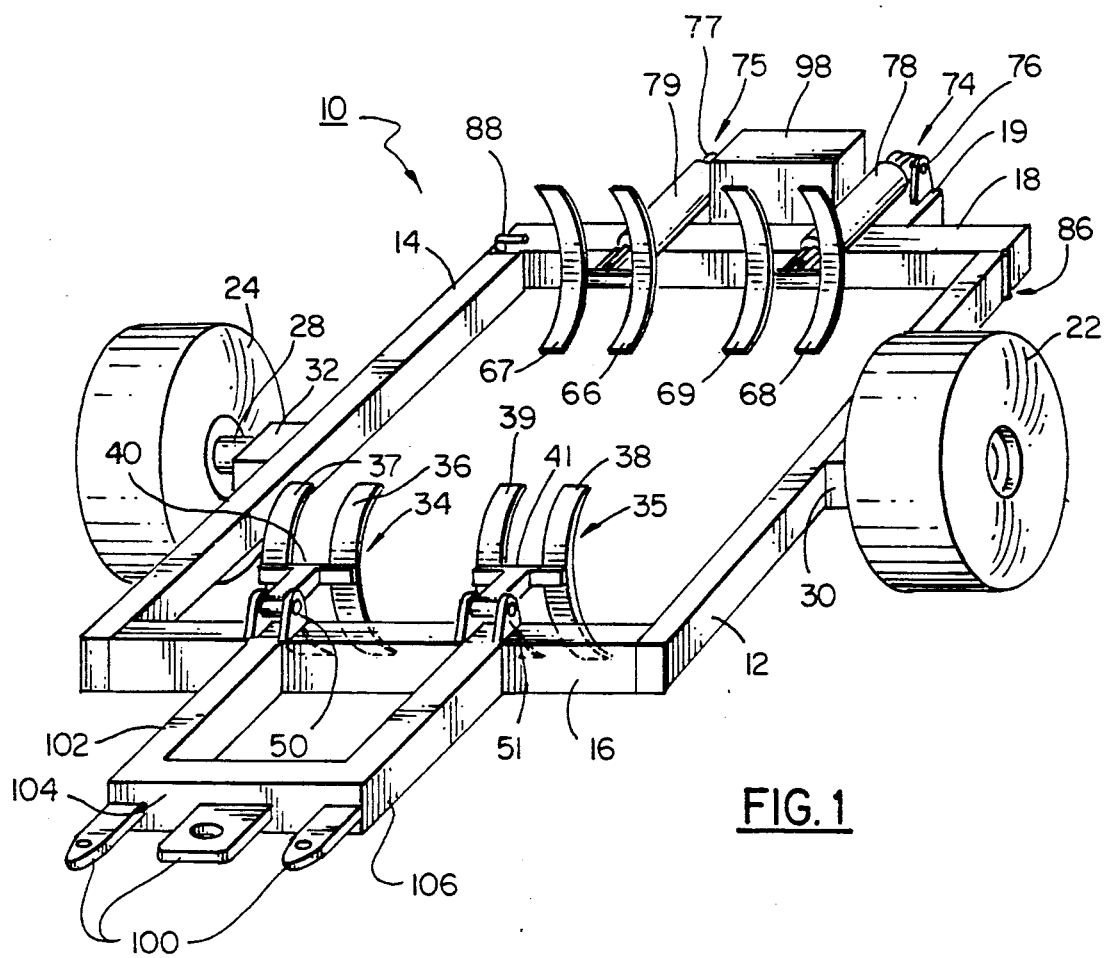
FIG. 1 is a perspective view of the instant invention incorporated into a towed trailer.
Figure 2:
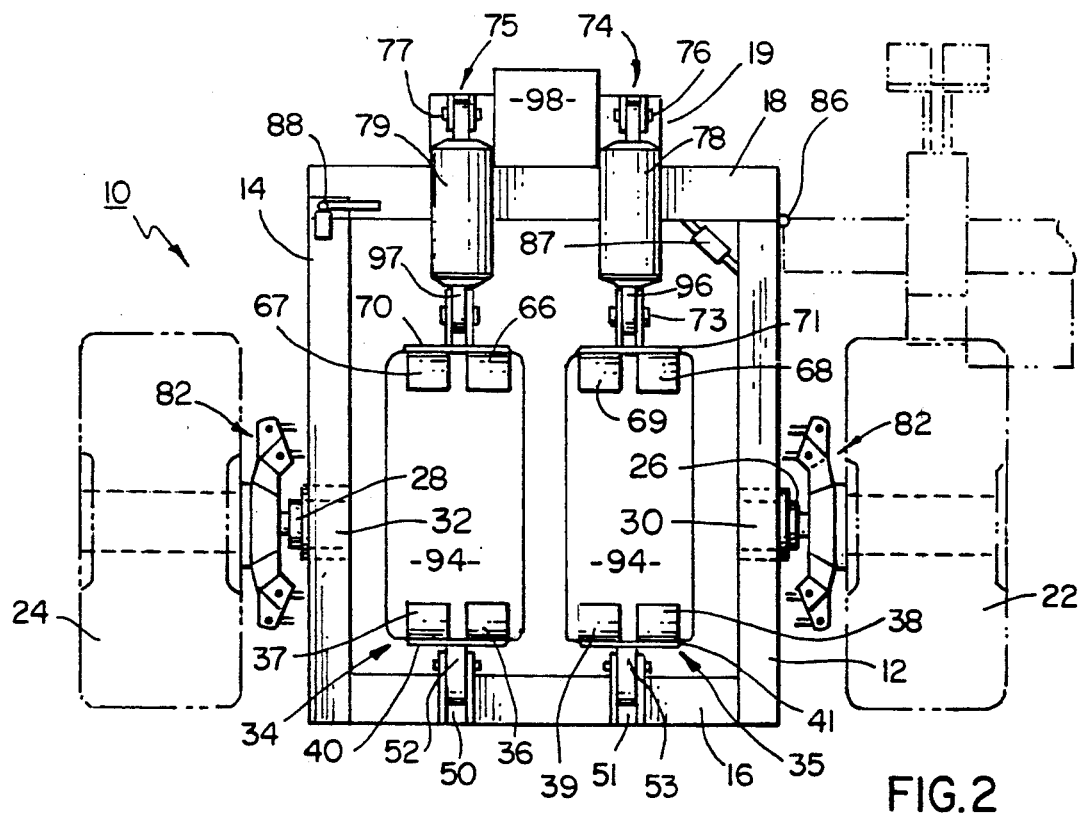
FIG. 2 is a top plan view of the present invention.
Figure 6:
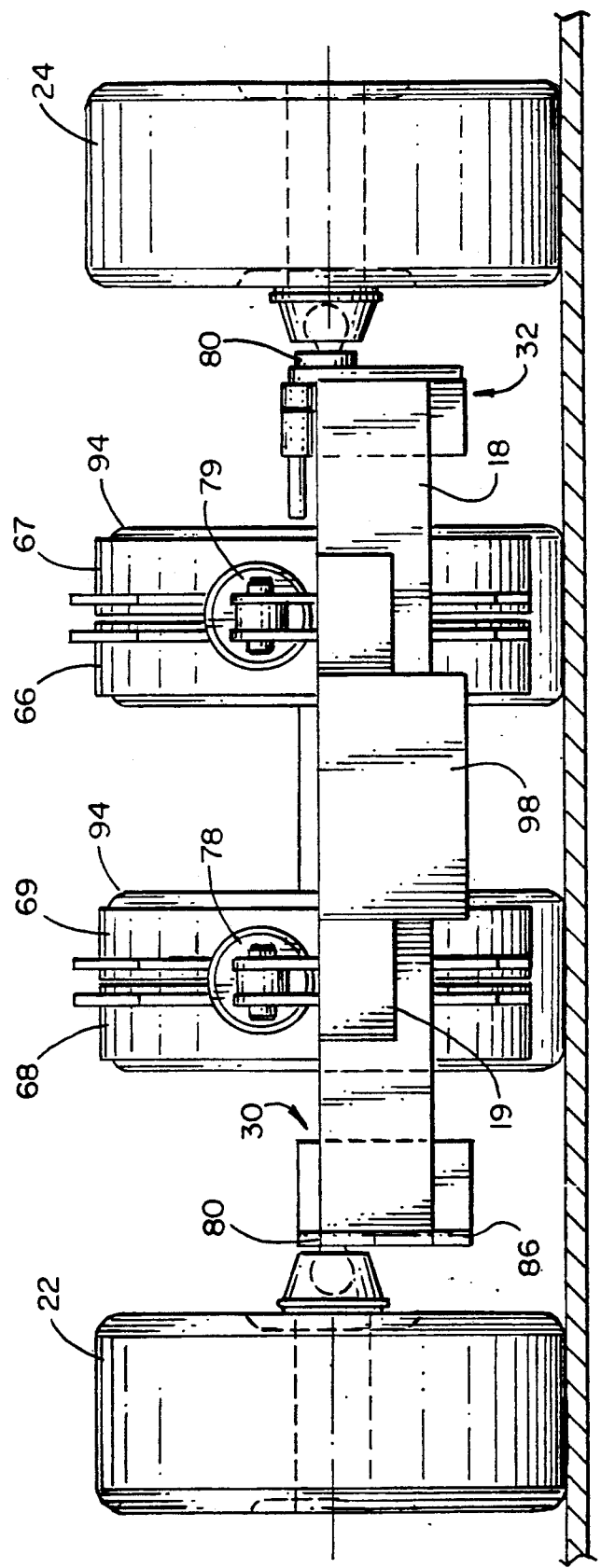
FIG. 6 is a rear elevational view of the present invention.

Referring now to the drawings, and especially FIGS. 1, 2 and 6, the present invention is shown generally at 10 including a rigid rectangular frame comprised of steel side beams 12 and 14 which are rigidly attached to a steel front beam 16 and a steel rear beam 18. The rear beam 18 is attached by hinge 86 to side beam 12 which permits the rear beam to be moved relative to the frame into an open position as will be discussed below. The side beams 12 and 14 have attached thereto a pair of supporting wheels 22 and 24 respectively which have shafts 26 and 28 attached to a bearing assembly, not shown, and which are firmly attached in a housing 30 and 32 on each side. Note that there is no axle disposed within the frame between wheels 22 and 24 so that the center portion of the rectangular frame is open. This is the area in which the nose wheels 94 (FIG. 3) and aircraft wheel assembly 92 of the aircraft to be towed will be positioned.

Shafts 26, 28 may be attached to motors 80 (FIG. 6) providing motive force for the invention 10 through wheels 22, 24. Motors 80 may be of any variety common in the art including electric and hydraulic.

Figure 8:
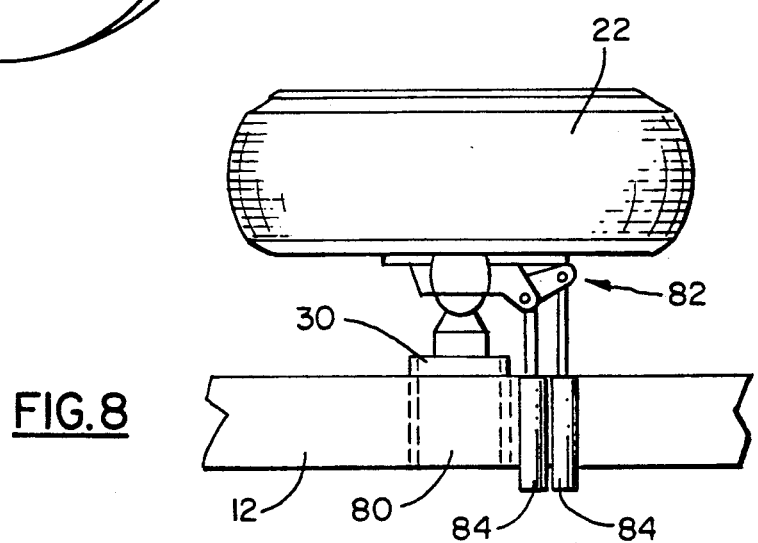
FIG. 8 is a plan view of the invention showing an embodiment of the power steering mechanism.

In addition, a steering mechanism 82 is preferably attached to shafts 26, 28 so that wheels 22, 24 may be independently steered. Steering of wheels 22, 24 increases the maneuverability of the invention 10 thereby allowing the invention 10 to work in the sometimes limited space found at airports and to precisely position the aircraft that is towed. Steering mechanism 82 is preferably attached to hydraulic rams 84 (FIG. 8) to provide "power steering" of wheels 22, 24 as is common in the industry.

The front beam 16 includes clevises 50 and 51 having attaching arms 52 and 53 for pivotally attaching a pair of forward nose wheel support devices shown generally at 34 and 35 respectively. The forward nose wheel support devices 34 and 35 each include a pair of arcuate rigid steel forward nose wheel engaging members, 36 and 37, and, 38 and 39, respectively. Each pair of forward nose wheel engaging members acts to engage individually a single tire of a large nose wheel assembly such as a Boeing 747. In other words, with four forward nose wheel engaging members 36, 37, 38 and 39, arranged in two pairs, two nose wheel tires can be supported. The concave curvature of each forward nose wheel engaging members 36, 37, 38, and 39 is such that the exterior surface and outside circumference of a nose wheel tire will fit snugly and flushly against the inside concave portion of each nose wheel engaging member. The pairs of tire engaging members 36, 37 and 38, 39 respectively are attached to the supporting bar 40 and 41 which allow the forward nose wheel engaging members 34 and 35 to be pivotably moved relative to clevis 50 and 51.

The rear support beam 18 preferentially includes an additional supporting bar 19, rigidly attached to rear beam 18, which houses clevises 74 and 75. Attached to each clevis 74 and 75 are individual hydraulically actuated pistons 78 and 79 respectively. Each piston 78, 79 moves around pin 76 and 77 attached to clevis 74 and 75 respectively. This pivotal movement of pistons 78, 79 around pins 76, 77 allows pistons 78, 79 to hydraulically extend in a variety of directions, including directions that include a substantial component tangential to nose wheel 94 at a point on wheel 94 opposite clevises 51, 50. The forward extending shafts 96, 97 of the hydraulic pistons 78 and 79 are connected to supporting bars 71 and 70 which themselves are firmly attached to the pairs of rear nose wheel engaging arcuate members 66, 67 and 68, 69. The rear nose wheel engaging members 66, 67, 68 and 69 are laterally grouped together in groups of two, each group engaging a separate tire in the nose wheel assembly of the aircraft to be towed. The arcuate curvature is such that the rear nose wheel engaging members 66, 67, 68 and 69 each fit snugly along approximately 100 degrees of the exterior circumference of the aircraft tires.

Referring now to FIG. 2, the rear beam 18 and its additional supporting bar 19 are shown in phantom in an open position, allowing access by nose wheels 94 (FIG. 3) to the center of the frame. This open position is achieved by yet another hydraulically actuated cylinder 87, attached both to side beam 12 and rear beam 18, which can be used to open and close the rear beam 18. A lock mechanism 88 is included to firmly lock rear beam 18 in a closed position when the aircraft nose wheels are engaged therein.

A hydraulic pump 98, such as is common in the industry, is shown which is connected to each of the hydraulic pistons 78 and 79 to provide fluid energy to actuate the hydraulic pistons.

An additional support frame is attached to the front face of front beam 16 in the form of additional frame members 102, 104 and 106 which, as shown in FIG. 1. In the preferred embodiment, support members 102, 104 and 106 may be attached to a tractor through tongues 100 which each can receive a pin (not shown) to connect the invention 10 to slotted clevis receptacles on a towing tractor (now shown). The preferred number of such tractor attachments 100 and corresponding slotted clevis attachments is three so that a rigid connection is made between the trailer comprising the invention 10 and a towing tractor. Therefore, the invention 10 can be connected to a tractor vehicle by the connecting clevis units already present on the tractor vehicle used to connect a tow bar to the tractor vehicle.

Figure 4:
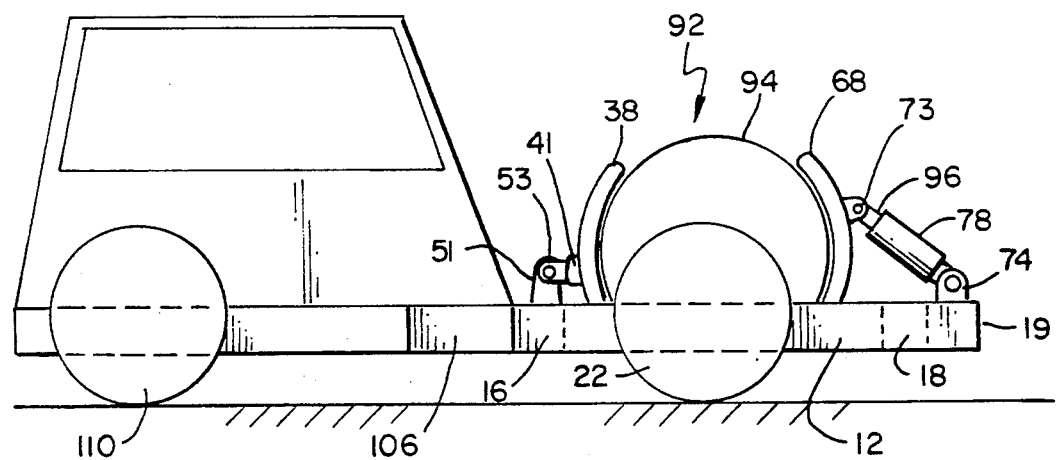
FIG. 4 is a side elevational view of an aircraft towing tractor incorporating the present invention.

In an alternative embodiment, the support frame members 102, 104 and 106, or a variation thereon, may be permanently mounted as part of a towing vehicle as shown in FIG. 4.

Because nose wheel 94 is located between and in contact with both forward nose wheel engaging members 36, 37, 38, 39 and corresponding rear nose wheel engaging members 66, 67, 68, 69, any force applied toward the nose wheel 94 by rear nose wheel engaging members 66, 67, 68, 69 will be transferred through nose wheel 94 to forward nose wheel engaging members 36, 37, 38, 39. Nose wheel 94 will rotate around clevises 50, 51 attached to forward nose wheel engaging members 36, 37, 38, 39 when a torque is applied by clevises 50, 51. The force component of the torque is applied by hydraulic pistons 78, 79 operating on rear nose wheel engaging members 66, 67, 68, 69 and consequently on nose wheel 94.

Figure 5:
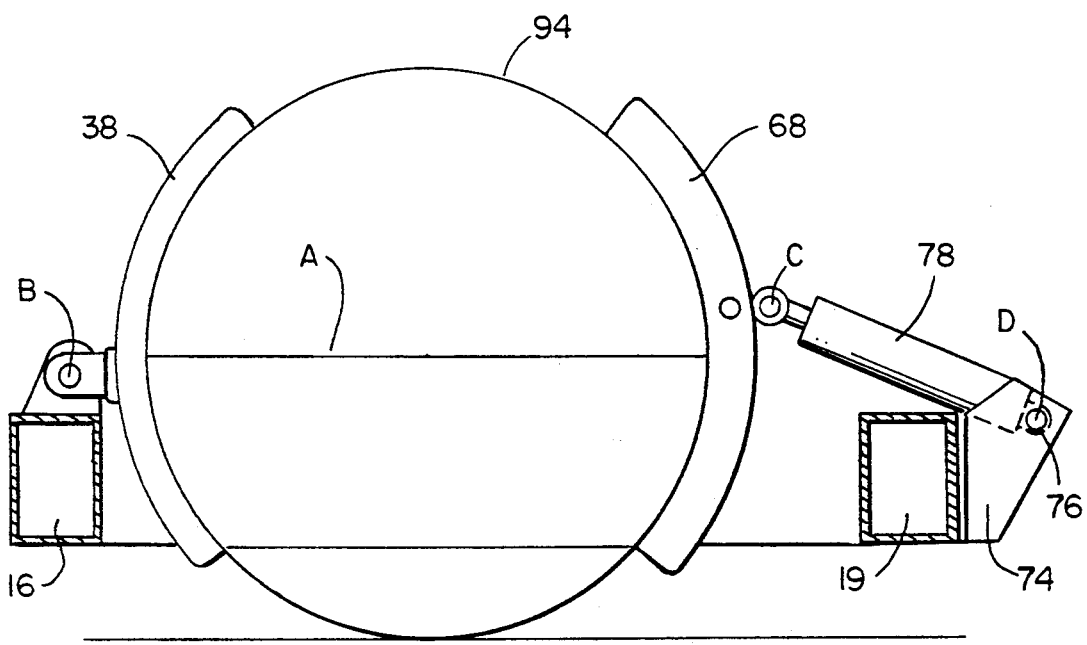
FIG. 5 is a schematic side view of the invention showing the relative location of the pivoting connections of front and rear nose wheel engaging members to each other and the center of gravity of the aircraft nose wheel.
Figure 7:
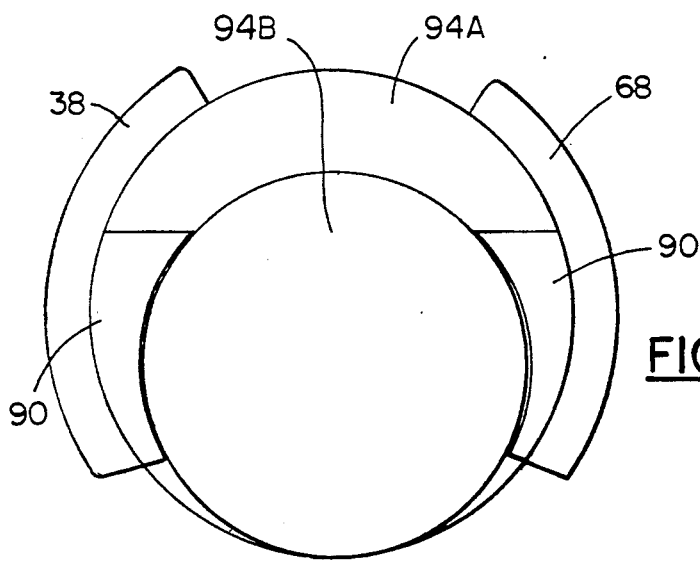
FIG. 7 is a side schematic view of the chocks of the present invention in place around a nose wheel.

FIG. 5 shows the position of the pivoting points for the forward nose wheel engaging members 36, 37, 38, 39 and the rear nose wheel engaging members 66, 67, 68, 69, relative to each other and to the center of gravity of the aircraft nose wheel 94. Line A represents a line through the center of gravity of the nose wheel 94 which line is parallel to the earth's surface. As can be seen, the pivot point B for the forward nose wheel engaging members 36, 37, 38, 39 is located below line A.

Also shown is the pivot point C for the rear nose wheel engaging members 66, 67, 68, 69. Piston 78 is also pivotally connected at D by pin 76 to clevis 74. Pivot D is lower than pivot C so that as Piston 78 is hydraulically expanded, the direction of expansion will include a component tangential to the circumference of wheel 94 near C. This tangential force component from the expansion of piston 78 facilitates the rotation of forward nose wheel engaging members 36, 37, 38, 39 around pivot point B by creating a torque around pivot B. This torque lifts wheel 94 off the ground and rotates wheel 94 around pivot B.

Figure 3:
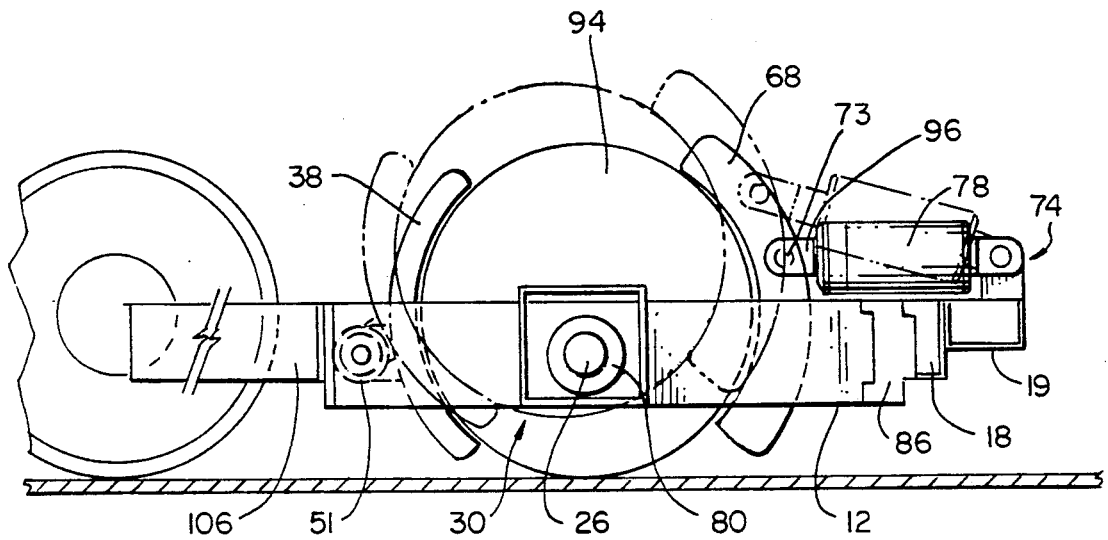
FIG. 3 is a side elevational schematic view of the operation of the present invention with the aircraft wheel on the ground and the aircraft wheel raised off the ground shown in phantom.

FIG. 3 shows the operation of the invention with aircraft wheel 94 positioned between the forward nose wheel engaging member 38 and rear nose wheel engaging members 68. Once the aircraft tire 94 is snugly fit against the curved portion of forward nose wheel engaging member 38, and the rear beam 18 has been closed, the rear nose wheel engaging member 68 rests snugly against the exterior circumference of tire 94. As can be sen, the tire 94 is on the ground.

Also in FIG. 3, aircraft wheel 94 is shown in phantom in a lifted position caused by the actuation of hydraulic piston 78 through forward extending shaft 96 attached to supporting bar 71 (now shown in this Figure) by clevis 73 which permits forward and upward movement of the rear arcuate tire engaging members 68, 69. Also during the actuation of the hydraulic cylinder 78, forward nose wheel engaging members 38, 39 pivot upwardly around clevis 51 to permit upward motion of the tire 94 off the ground. Of course, a similar actuation of hydraulic piston 79 raises the tire 94 between rear tire engaging members 66, 67 and corresponding forward arcuate tire engaging members 36, 37. In this position it is noted that the aircraft tire 94 is held firmly in position above the ground with the hydraulic fluid in pistons 78, 79 locking the rear nose wheel engaging members 66, 67, 68 and 69 in this raised position. The entire frame can thus move the aircraft wheel assembly 92 so that the aircraft can be towed.

The position shown in phantom in FIG. 3 will be maintained until the aircraft has arrived at its ultimate destination on the taxi way or adjacent the terminal. At that time hydraulic pistons 78, 79 have the pressure reduced so that shafts 96, 97 withdraw into the hydraulic pistons 78, 79 thus lowering the tire 94 to the ground. Once the tire is safely on the ground then the rear support beam 18 (FIG. 2) is unlocked through lock 88 and swung open through the actuation of hydraulic cylinder 87 to the opened position shown in phantom. This permits the aircraft tires 94 to then be removed from the frame by forward movement of the invention 10 away from the aircraft wheel assembly 92.

FIG. 4 shows one possible permanent installation of the invention on a conventional four wheel towing vehicle having a conventional motor and additional power units such as electrical generators for driving the hydraulic pump as is common for such towing vehicles. The conventional tires 110 of the tractor can be independently steered while the present invention 10 is firmly attached at the rear of the towing vehicle as shown through the additional frame members 102, 104 and 106 of FIG. 1.

One of the advantages in using the present invention described herein is that the towing vehicle does not have to be ballasted for handling the heavy weight loads experienced from large aircraft nose wheel assemblies such as a Boeing 747 because the nose wheel engaging members, front and rear, are mounted relative to the frame of the invention and the trailer frame wheels 22, 24 of the invention so that the center of gravity of the trailer and trailer wheels are substantially aligned with the center of gravity of the aircraft wheel assembly 92. With the weight of aircraft transferred down to the invention 10 through the aircraft wheel assembly 92 as described above, there will be no additional moments of force that would tend to lift either the front or back of the towing vehicle itself.

Power in the form of electrical or hydraulic power to the hydraulic pump, as shown on the vehicle, may be provided by conventional power sources found on current tractors. The specific location of the hydraulic pump can be either on the vehicle frame or could be mounted on the vehicle housing itself. Hydraulic lines may easily be disposed to permit actuation of pistons 78 and 79 and opening of the rear beam 18 to allow the ingress and egress of the aircraft wheel assembly 92.

Because different aircraft have different sized nose wheels 94, chocks 90 may be attached to the lower insides of forward and rear nose wheel engaging arcuate members 36, 37, 38, 39 and 66, 67, 68, 69 respectively by nuts and bolts or any other common fastening system. In this context, the radius of curvature for the forward and rear nose wheel engaging arcuate members is such that the largest aircraft nose wheels 94A likely to be encountered will be accommodated. In operation, the largest nose wheel 94A likely to be encountered belongs to the Boeing 747 aircraft.

Chocks 90 have an inside radius of curvature corresponding to smaller sized nose wheels 94B such as those on a MacDonald Douglass DC-9. The outside radius of curvature of chocks 90 corresponds to the inside radius of curvature of forward and rear nose wheel engaging arcuate members so that chocks 90 will be securely positioned thereto by the conforming surfaces of the respective chocks and forward and rear nose wheel engaging arcuate members.

When chocks 90 are used, closing rear beam 18 after nose wheels 94B are placed in the center of the frame brings chocks 90 into contact with nose wheels 94B. Subsequent actuation of hydraulic pistons 78, 79 will cause forward and upward movement of rear nose wheel engaging members 66, 67, 68, 69 as explained heretofore. This motion will cause nose wheels 94B to rotate around clevises 50, 51 attached to forward nose wheel engaging members 36, 37, 38, 39, thereby lifting nose wheels 94B off the ground in the manner heretofore described.

The instant invention has been shown and described herein in what it is considered to be the most practical and preferred embodiment. It is recognized, however, that departures may be made therefrom within the scope of the invention and that obvious modifications will occur to a person skilled in the art.

What I claim is:

1. A towing vehicle for towing a large aircraft, said aircraft having a nose wheel resting on a ground surface, said nose wheel having a front and rear outside circumference, said nose wheel having a center of gravity, said towing vehicle lifts, supports and moves said nose wheel and consequently said aircraft itself, comprising:
    (a) a frame having a nose wheel receiving area located internal to said frame, said frame comprising:
        first and second rigid side frame members, each having a front end and a rear end;
        a front frame member connecting said front end of each of said side frame members;
        at least one rear frame member pivotally attached to said rear end of said side member thereby allowing access to said nose wheel receiving area;
    (b) forward nose wheel engaging means disposed at said front end of said frame member and directed toward said nose wheel receiving area, said forward nose wheel engaging means shaped to engage a substantial portion of said front outside circumference of said aircraft nose wheel;
    (c) means for connecting and horizontally pivoting said forward nose wheel engaging means around said front end of said frame;
    (d) rear nose wheel engaging means disposed at said rear end of said frame member and directed toward said nose wheel receiving area, said rear nose wheel engaging means shaped to engage a substantial portion of said rear outside circumference of said aircraft nose wheel;
    (e) hydraulic means, pivotally connected to and disposed between both said rear nose wheel engaging means and said rear frame member, for connecting said rear nose wheel engaging means to said rear frame member and for moving said rear nose wheel engaging means from a first position where said nose wheel, positioned between and engaged by said forward and rear nose wheel engaging means, is resting on said ground surface, to a second position where said nose wheel, still positioned between and engaged by said forward and rear nose wheel engaging means, is lifted above said ground surface, said hydraulic means having a direction of expansion directed at a point on said forward nose wheel engaging means above said means for connecting and horizontally pivoting said forward nose wheel engaging means so that force applied to said rear nose wheel engaging means by said hydraulic means will be transferred to said nose wheel and subsequently to said forward nose wheel engaging means causing said forward nose wheel engaging means and consequently said nose wheel to rotate around said means for connecting and horizontally pivoting said forward nose wheel engaging means so that said nose wheel will be lifted off said ground surface; and, (f) means for moving said towing vehicle and said aircraft when said nose wheel is lifted and supported by said tow vehicle.

2. The device of claim 1 wherein said means for moving said towing vehicle includes first and second towing vehicle wheels each individually respectively connected to opposite side frame members so that an unencumbered nose wheel receiving area is created between said first and second rigid side frame members.

3. The device of claim 2 further comprising means for steering said first and second towing vehicle wheels.

4. The device of claim 3 wherein said means for steering said first and second towing vehicle wheels comprises power steering means.

5. The device of claim 1 wherein said forward nose wheel engaging means are concavely curved to approximately 100 degrees of the exterior circumference of said nose wheel.

6. The device of claim 1 wherein said means for connecting and horizontally pivoting said forward nose wheel engaging means around said front end of said frame is located at a point below a line parallel to planet earth passing through said center of gravity of said nose wheel so that a force directed through the center of gravity of said nose wheel at a point along said forward nose wheel engaging means above said means for connecting and horizontally pivoting said forward nose wheel engaging means will cause said forward nose wheel engaging means to rotate around said means for connecting and horizontally pivoting thereby lifting said nose wheel off the ground.

7. The device of claim 1 wherein said rear nose wheel engaging means are concavely curved to approximately the exterior circumference of said nose wheel.

8. The device of claim 1 wherein said hydraulic means is pivotally connected to said rear frame member at a point lower than the point where said hydraulic means is pivotally connected to said rear nose wheel engaging means.

9. The device of claim 1 wherein said towing vehicle is a trailer which is towed behind a conventional aircraft towing tractor.

10. The device of claim 1 wherein said towing vehicle is a self contained towing vehicle wherein said means for moving said towing vehicle is provided on board said towing vehicle so that said towing vehicle and said means for moving said towing vehicle are contained in one unit.

* * * * *